United States Patent
Polaganga et al.

(10) Patent No.: US 12,015,960 B1
(45) Date of Patent: Jun. 18, 2024

(54) SYSTEM AND METHOD FOR REDIRECTION TO OPTIMAL ANTENNA ARRAYS

(71) Applicant: T-Mobile Innovations LLC, Overland Park, KS (US)

(72) Inventors: Roopesh Kumar Polaganga, Bothell, WA (US); Sreekar Marupaduga, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 121 days.

(21) Appl. No.: 17/465,327

(22) Filed: Sep. 2, 2021

(51) Int. Cl.
H04W 36/22 (2009.01)
H04B 7/0413 (2017.01)
H04W 28/02 (2009.01)
H04W 36/00 (2009.01)

(52) U.S. Cl.
CPC .......... H04W 36/22 (2013.01); H04B 7/0413 (2013.01); H04W 28/0252 (2013.01); H04W 36/0027 (2013.01)

(58) Field of Classification Search
CPC ............. H04W 36/22; H04W 28/0252; H04W 36/0027; H04B 7/0413
See application file for complete search history.

(56) References Cited

U.S. PATENT DOCUMENTS

| | | | | |
|---|---|---|---|---|
| 8,195,143 B2 * | 6/2012 | Erceg | .................... | H04W 36/28 455/142 |
| 10,044,426 B1 * | 8/2018 | Pawar | .................. | H04B 7/0452 |
| 10,826,581 B1 * | 11/2020 | Noorzad | ............... | H04B 7/0482 |
| 10,939,331 B2 * | 3/2021 | Schneider | ............. | H04W 36/02 |
| 11,031,988 B2 * | 6/2021 | Natarajan | ............... | H04B 7/082 |
| 11,115,106 B1 * | 9/2021 | Pawar | .................. | H04B 7/0814 |
| 11,337,119 B2 * | 5/2022 | Youtz | ................ | H04W 36/0027 |
| 11,589,354 B1 * | 2/2023 | Pawar | ................... | H04L 5/0098 |
| 11,622,309 B2 * | 4/2023 | Paladugu | .............. | H04W 36/32 370/331 |
| 2006/0176974 A1 * | 8/2006 | Smith | .................. | H04B 7/0617 375/267 |

(Continued)

FOREIGN PATENT DOCUMENTS

| | | | | |
|---|---|---|---|---|
| CA | 2641444 A1 * | 8/2007 | ........... | H04B 7/0413 |
| CA | 2784034 A1 * | 7/2011 | ........... | H04B 7/0413 |

(Continued)

*Primary Examiner* — Yuwen Pan
*Assistant Examiner* — Swati Jain
(74) *Attorney, Agent, or Firm* — Shook, Hardy & Bacon L.L.P.

(57) ABSTRACT

Systems and methods for directing a user equipment (UE) to optimal antenna arrays during fallback procedures or handover procedures. The method can include the steps of determining that the UE is connecting to a first network and automatically assigning the UE to a first antenna array having a first multiple input multiple output (MIMO) configuration when the UE is in a data session. Furthermore, the method can include the step of automatically assigning the UE to a second antenna array having a second MIMO configuration when the UE is in a non-data session, such as a voice session. The first MIMO configuration can have a higher number of channels or antennas than the second MIMO configuration.

16 Claims, 4 Drawing Sheets

(56) References Cited

U.S. PATENT DOCUMENTS

| | | | |
|---|---|---|---|
| 2007/0223423 A1* | 9/2007 | Kim | H04B 7/0452 370/334 |
| 2011/0222469 A1* | 9/2011 | Ali | H04L 1/0009 370/328 |
| 2013/0163464 A1* | 6/2013 | Lau | H04W 36/22 455/440 |
| 2014/0119342 A1* | 5/2014 | Tomoe | H04L 69/22 370/331 |
| 2014/0307818 A1* | 10/2014 | Jindal | H04W 16/00 375/267 |
| 2014/0307819 A1* | 10/2014 | Paulraj | H04B 7/0452 375/267 |
| 2014/0369308 A1* | 12/2014 | Gerstenberger | H04B 7/0413 370/329 |
| 2015/0208286 A1* | 7/2015 | Ozturk | H04W 36/14 370/331 |
| 2017/0117955 A1* | 4/2017 | Chandra | H04L 1/0017 |
| 2019/0089420 A1* | 3/2019 | Koskela | H04B 7/0639 |
| 2019/0166603 A1* | 5/2019 | Wang | H04B 7/0868 |
| 2020/0015128 A1* | 1/2020 | Stojanovski | H04W 76/50 |
| 2020/0205044 A1* | 6/2020 | Lin | H04L 65/1016 |
| 2020/0344657 A1* | 10/2020 | Paladugu | H04W 36/18 |
| 2021/0266050 A1* | 8/2021 | Sahoo | H04B 7/0632 |
| 2021/0351816 A1* | 11/2021 | Raghavan | H04B 7/0413 |
| 2021/0400748 A1* | 12/2021 | Subramanian | H04W 76/15 |
| 2022/0141719 A1* | 5/2022 | Shan | H04W 36/26 370/331 |
| 2022/0322175 A1* | 10/2022 | Liu | H04W 36/22 |
| 2022/0417823 A1* | 12/2022 | Jia | H04W 24/08 |
| 2023/0018958 A1* | 1/2023 | Gan | H04W 76/30 |
| 2023/0069008 A1* | 3/2023 | Manithara Vamanan | H04W 28/02 |
| 2023/0164642 A1* | 5/2023 | Zhao | H04W 36/0022 370/331 |
| 2023/0189089 A1* | 6/2023 | Xu | H04W 36/0072 370/332 |
| 2023/0300674 A1* | 9/2023 | Kedalagudde | H04W 24/10 370/230.1 |

FOREIGN PATENT DOCUMENTS

| | | | | |
|---|---|---|---|---|
| CA | 3072411 A1 * | 2/2019 | | H04L 65/1016 |
| WO | WO-03073645 A1 * | 9/2003 | | H04B 7/0408 |
| WO | WO-2013044958 A1 * | 4/2013 | | H04W 28/08 |
| WO | WO-2017001948 A1 * | 1/2017 | | H04B 7/024 |
| WO | WO-2017062244 A1 * | 4/2017 | | H04L 61/1588 |
| WO | WO-2018118677 A2 * | 6/2018 | | |
| WO | WO-2018120241 A1 * | 7/2018 | | H04M 1/57 |
| WO | WO-2021055368 A1 * | 3/2021 | | H04B 7/15 |
| WO | WO-2022092897 A1 * | 5/2022 | | |

* cited by examiner

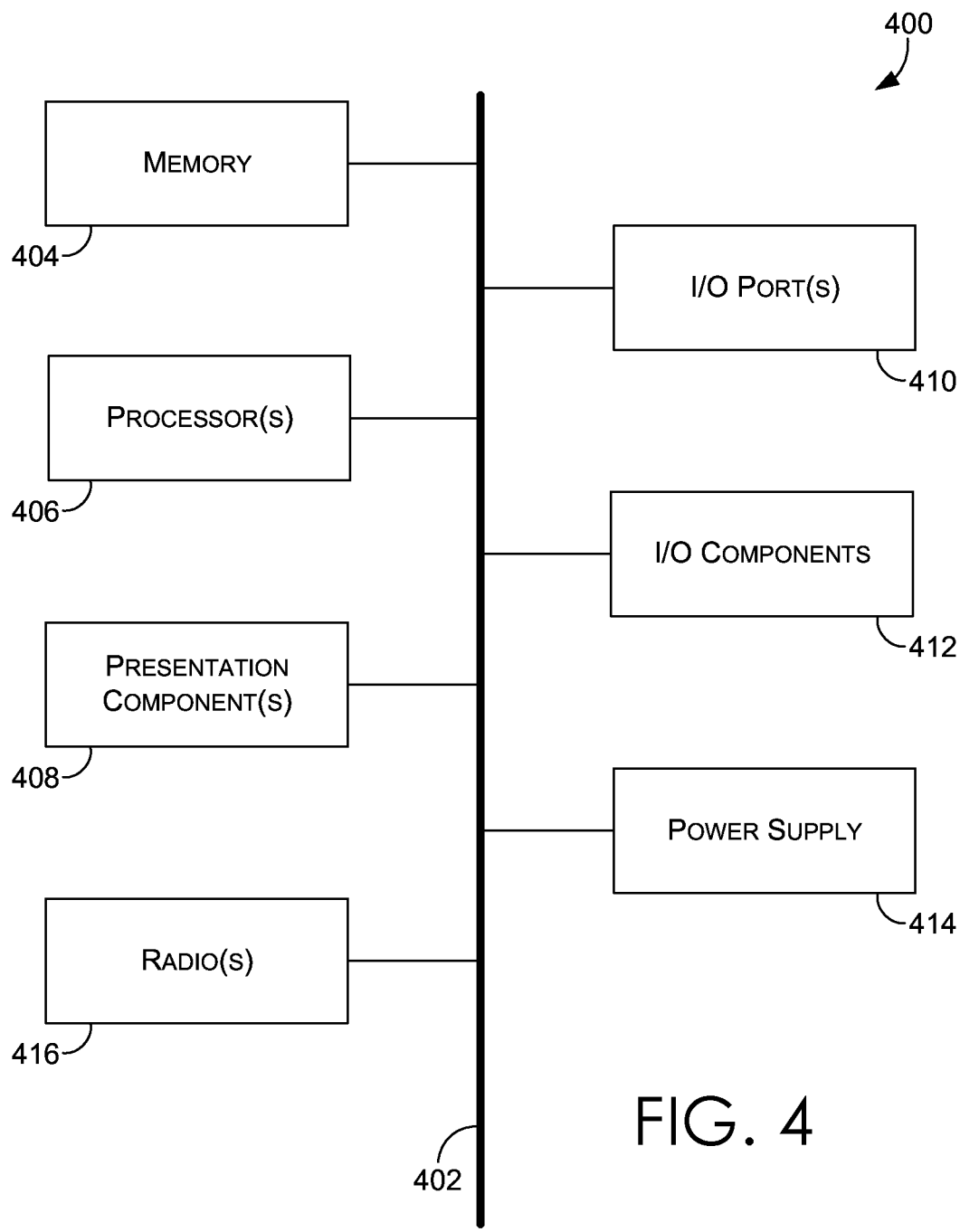

SYSTEM AND METHOD FOR REDIRECTION TO OPTIMAL ANTENNA ARRAYS

BACKGROUND

In telecommunication networks, user equipment (UE) can attach to a node via handover procedures or during fallback procedures. Some network operators deploy standalone-based 5G networks while utilizing legacy long term evolution (LTE) networks for seamless voice services using evolved packet system (EPS) fallback mechanisms. Fallback occurs, for example, between a 5G standalone (SA) network and an LTE network or an LTE antenna array of a 5G non-standalone (NSA) network in situations where the 5G SA network cannot yet handle the requested services. Some requested services that can automatically trigger such fallback can include, for example, emergency 911 services and voice services (as opposed to data services which could be provided via the 5G SA network). Handovers to nodes and/or layers of the LTE network can occur based on measurements performed by the UE, such as loss of signal strength.

The LTE network can include different LTE antenna arrays (e.g., LTE layers, nodes, or connection points) having different multiple input multiple output (MIMO) configurations, such as a two by two configuration or a four by four configuration. Some MIMO configurations are better suited for handling voice traffic while others are better suited for handling data traffic. Traditionally, all UEs during fallback or handover are sent to a specific LTE antenna array having a specific MIMO configuration, regardless of the type of traffic being sent and received by the UE, based on hard-coded instructions.

SUMMARY

The present disclosure is directed, in part, to systems and methods for directing a user equipment (UE) to optimal antenna arrays of a first network, such as a long term evolution (LTE) network, during fallback procedures or handover procedures. In some embodiments, the method includes the steps of determining that the UE is connecting to the first network (e.g., the LTE network or an LTE node of a 5G non-standalone (NSA) network) and automatically assigning the UE to a first antenna array having a first multiple input multiple output (MIMO) configuration when the UE is in a data session. Furthermore, the method can include the step of automatically assigning the UE to a second antenna array having a second MIMO configuration when the UE is in a non-data session. Determining whether the UE is in a data session or a non-data session (e.g., a voice session) can include receiving a last-assigned 5G quality of service indicator (5QI) that indicates whether the UE is in the data session or the non-data session. In some embodiments, the first antenna array can have more channels or antennas than the second antenna array.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein:

FIG. 4 depicts an exemplary computing environment suitable for use in implementations of the present disclosure.

DETAILED DESCRIPTION

Figure 1:
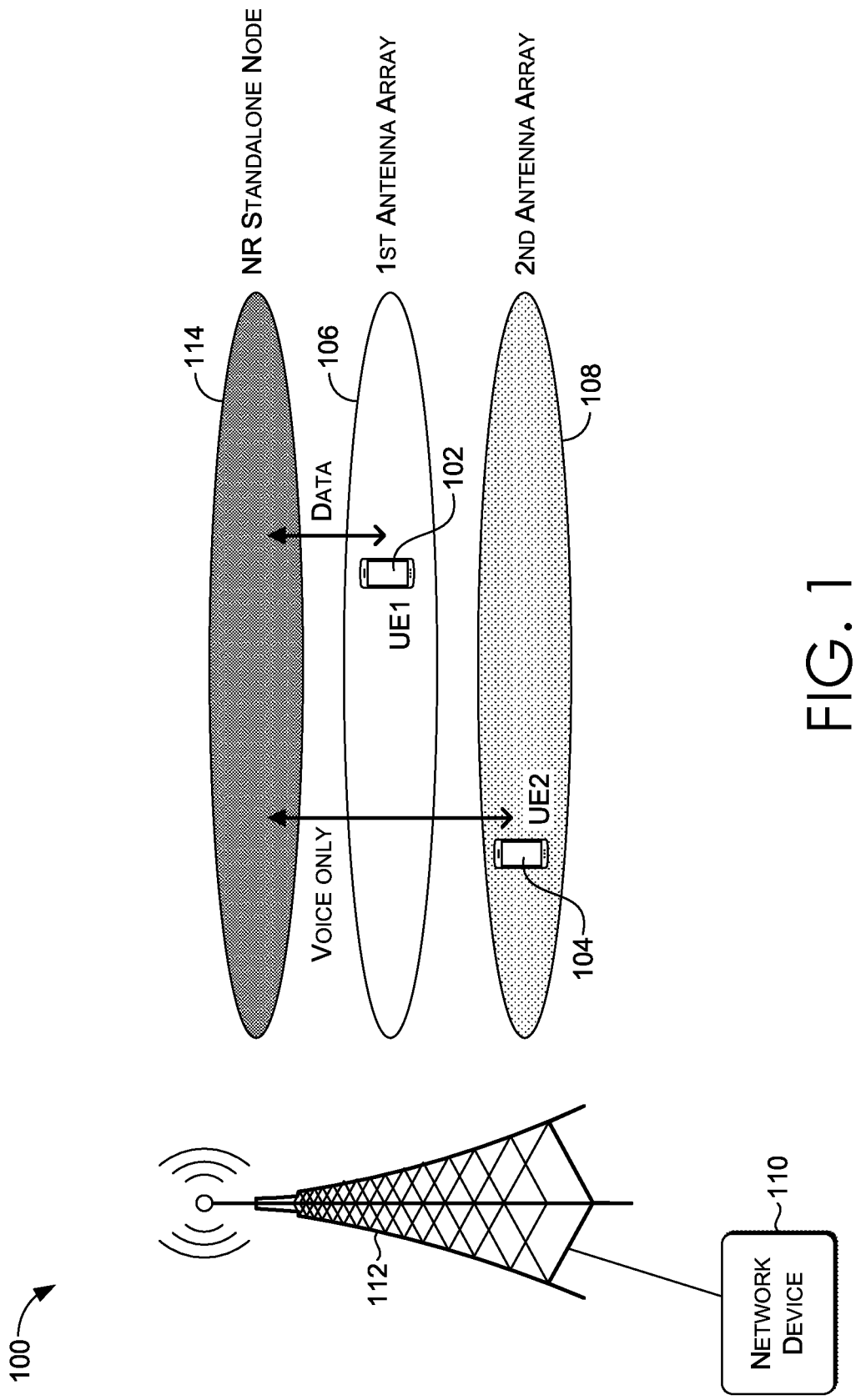
FIG. 1 depicts a diagram of an exemplary system suitable for use in implementations of the present disclosure, sharing data in accordance with aspects herein.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of this technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and non-volatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, in telecommunications networks, user equipment (UE) can attach to a node via handover procedures or during fallback procedures. As defined herein, the UE can be a cellular phone, a mobile phone, a smart phone, or other electronic devices operable to communicate via telecommunication networks. Some telecommunications network operators deploy standalone-based 5G networks while utilizing legacy long term evolution (LTE) networks for seamless voice services using evolved packet system (EPS) fallback mechanisms.

Fallback occurs, for example, between a 5G standalone (SA) network and an LTE network or an LTE antenna array in situations where the 5G SA network cannot yet handle the requested services. Some requested services that can automatically trigger such fallback can include, for example, emergency 911 services and voice services (as opposed to data services which could be provided via the 5G SA network). Another embodiment in which fallback can occur is when the UE experiences 5G coverage issues. Likewise, handovers to other nodes and/or antenna arrays of the LTE network can occur based on measurements performed by the UE, such as when signal strength becomes too weak.

Traditionally, all UEs during fallback or handover are sent to a specific LTE antenna array based on its coverage profile and/or load balancing requirements. Different antenna arrays can include different multiple input multiple output (MIMO) configurations, such as a two by two configuration or a four by four configuration. The MIMO configuration or MIMO dimension can, for example, depend on the number of antennas transmitting and receiving. In some embodiments, a 4×4 MIMO configuration has four transmit antennas and four receive antennas. Likewise, in some embodiments, a 2×2 MIMO configuration uses two transmit antennas and two receive antennas.

A 4×4 MIMO configuration provides benefits over a 2×2 MIMO configuration for large data files or video streaming, for example. However, for voice applications, throughput requirements are low, so the 2×2 MIMO configuration can be used. Nevertheless, there are currently no mechanisms to assign handover or fallback UEs to supported MIMO antenna arrays based on which applications the UEs are utilizing at the moment of handover or fallback.

The present disclosure is generally directed to a system for directing a UE to an LTE antenna array having a particular MIMO configuration based on whether the UE is currently in a voice session, a data session, or both during handover or fallback procedures. In some embodiments herein, the voice session can be a voice-only session and the data session can be any session other than a voice-only session (such as SMS, video streaming, etc.). However, in other embodiments, the voice session can merely be a non-data session and can include types of traffic other than voice traffic (such as SMS sessions and the like), while the data session can be more limited in the types of sessions included therewith, depending on the optimal antenna array the operator wishes to use for different types of traffic to and from the UEs.

The method can include the steps of determining that the UE is connecting to an LTE network or an LTE antenna array as a result of a handover or fallback procedure and automatically assigning the UE to a first antenna array having a first MIMO configuration when the UE is currently in a data session at the time of the handover or fallback procedure. Furthermore, the method can include the step of automatically assigning the UE to a second antenna array having a second MIMO configuration when the UE is currently only in a voice session at the time of the handover or fallback procedure.

FIG. 1 provides an exemplary system 100 comprising a network device 110 and/or one or more UEs 102,104. In some embodiments, the system 100 can further include various components of an LTE network or any first network, such as a first antenna array 106 and a second antenna array 108. The first network can be any telecommunications network. The system 100 can also include and/or utilize a cell tower 112 or the like for communication between the UEs 102,104 and the network device 110. Implementations of the present disclosure may be employed via the network device 110 for directing at least one of the UEs 102,104 to one of the first and second antenna arrays 106,108 during fallback, handover, or the like. During the fallback or handover procedures, one of the UEs 102,104 is disconnected from a second network, such as a 5G standalone (SA) network or a 5G SA node 114 and connected to the first network (e.g., the LTE network) via one of the first and second antenna arrays 106,108. The first and second antenna arrays 106,108 can be associated with the first network. The first network can be an LTE network, for example. However, other telecommunications networks can be used as the first network without departing from the scope of the technology described herein.

As described above, the first and second antenna arrays 106,108 can also be defined herein as nodes or connection points via which one of the UEs 102,104 connects to the first network or the LTE network (e.g., via the cell tower 112). In some embodiments, the system 100 can include a plurality of telecommunications networks and other components of a suitable environments for the methods described herein and are not intended to suggest any limitation as to the scope of use or functionality of the technology described herein. Neither should the system 100 be interpreted as having any dependency or requirement relating to any one or combination of components illustrated.

The network device 110 can include one or more processors and/or a non-transitory computer-readable media comprising executable instructions that, in response to execution, cause the network device 110 to perform operations in a radio access network (RAN). The network device 110 can include any plurality of administration servers, processors, and non-transitory computer-readable memory and can operate in the manners described herein without departing from the scope of the technology herein. The network device 110 can include any of the hardware components and/or functionality of computing device 400 depicted in FIG. 4 and described in detain below, such as processing capabilities, communication capabilities, and data storage.

As depicted in FIG. 1, the network device 110 can be associated with the first network (e.g., the LTE network) and communicably coupled with one or more of the UEs 102, 104 via the at least two antenna arrays 106,108 associated with the cell towers 112 or the like. In some embodiments, the first antenna array 106 corresponds to a first node (e.g., a first one of the cell towers 112) and the second antenna array 108 corresponds to a second node (e.g., a second one of the cell towers 112). However, in other embodiments, the first antenna array 106 corresponds to the first node and the second antenna array 108 corresponds to the first node. The UEs 102,104 can attach to the first network via the antenna arrays 106,108 during a fallback or handover procedure, such as when falling back from the second network.

In a simplified and illustrative call flow, the executable instructions on the non-transitory computer-readable media can comprise the step of determining that a UE (such as one of the UEs 102,104) is connecting to the first network via a fallback or handover procedure. Based on this trigger, the instructions can include a step of receiving an indication of whether the UE was in a voice session or a data session when this fallback or handover occurred. For example, the instructions can include a step of receiving a last-assigned 5G quality of service indicator (5QI) bearer of the UE when it connects to the first network.

In general, the last-assigned 5QI bearer can correspond to the last-assigned application the UE was running when the fallback or handover occurs. The last-assigned 5QI bearer can be included in data provided by the UE during fallback or handover procedures. The last-assigned 5QI bearer is assumed herein to also be the current 5QI bearer of the UE, providing an indication of what type of traffic is being sent and received by the UE at that time. In general, a 5QI value or 5QI bearer is a pointer to a set of QoS characteristics such as priority level, packet delay or packet error rate, or the like. These QoS characteristics can either be standardized or non-standardized. For example, different standardized 5QI values for different QoS flow types such as GBR, non-GBR and Delay Critical GBR flows can include:

| 5QI Value | Resource Type | Default Priority Level | Packet Delay Budget | Packet Error Rate | Default Averaging Window | Example Services |
|---|---|---|---|---|---|---|
| 1 | GBR | 20 | 100 ms | $10^{-2}$ | 2000 ms | Conversational Voice |
| 2 | GBR | 40 | 150 ms | $10^{-3}$ | 2000 ms | Conversational Video (Live Streaming) |
| 3 | GBR | 30 | 50 ms | $10^{-3}$ | 2000 ms | Real Time Gaming, V2X messages, Electricity distribution - medium voltage, Process automation - monitioring |
| 4 | GBR | 50 | 300 ms | $10^{-6}$ | 2000 ms | Non-Conversational Video (Buffered Streaming) |

However, 5QI values from 128 to 254 can be non-standardized and can be used for operator specific configurations. Additionally or alternatively, other types of quality of service indicators can be received to determine whether the UE is in a voice or a data session without departing from the scope of the technology described herein.

In some embodiments, when the last-assigned 5QI bearer is not equal to one (e.g., during a data session), the instructions can include a step of automatically assigning the UE to the first antenna array having a first multiple input multiple output (MIMO) configuration. When the last-assigned 5QI bearer is equal to one (e.g., during a voice-only session), the instructions can include a step of automatically assigning the UE to the second antenna array having a second MIMO configuration.

In some embodiments, the first antenna array has a four-by-four (4×4) MIMO configuration and the second antenna array has a two-by-two (2×2) MIMO configuration.

In other embodiments, the first antenna array has any MIMO configuration that is larger than the MIMO configuration of the second antenna array. MIMO configurations, as described herein, refer to a configuration with N number of transmitter antennas and M number of receiver antennas, with the MIMO configuration being referred to as an N×M MIMO configuration or an N×M system. In some embodiments, N is not necessarily equal to M. In some embodiments, a 4×4 MIMO configuration has four transmit antennas and four receive antennas. Likewise, in some embodiments, a 2×2 MIMO configuration uses two transmit antennas and two receive antennas. In some embodiments herein, the number or antennas are alternatively referred to as the number of channels or the number of send/receive channels of the antenna arrays.

Using MIMO configuration allows for sending the same data or voice information as several signals simultaneously through multiple antennas, while still utilizing a single radio channel. This improves signal quality and strength. The data or voice information is split into multiple data streams at the transmission point and recombined on the receive side by another MIMO radio configured with the same number of antennas. The receiver is designed to take into account the slight time difference between receptions of each signal, any additional noise or interference, and even lost signals.

Generally, a 4×4 MIMO configuration provides benefits over a 2×2 MIMO configuration for large data files or video streaming, for example. Thus, the system and methods herein are configured to assign the UE to the first antenna array with a larger MIMO configuration (e.g., 4×4 MIMO configuration) when the UE is currently handling data or both data and voice (e.g., when the 5QI bearer does not equal one). That is, when the UE is in a data session, the UE can be assigned to the first antenna array. However, for voice applications, throughput requirements are low, so the 2×2 MIMO configuration can be used. So the system and methods herein are configured to assign the UE to the second antenna array with a smaller MIMO configuration (e.g., 2×2 MIMO configuration) when the UE is currently handling voice but not data or voice-only (e.g., when the 5QI bearer equals one). For example, when the UE is in a non-data session (e.g., a voice session), the UE can be assigned to the second antenna array.

In some embodiments, the instructions can include a step of automatically assigning or reassigning the UE to either the first antenna array or the second antenna array based on reaching or exceeding a threshold of allowed UEs on another of the first antenna array and the second antenna array, regardless of the last-assigned 5QI bearer of the UE (or whether the UE is in a voice session or a data session). For example, if the last-assigned 5QI bearer of the UE is equal to one, the instructions could automatically assign the UE to the second antenna array. However, if the number of UEs assigned to the second antenna array at that moment (or when last checked) exceeds a threshold of allowed UEs thereon, then the UE is assigned or reassigned to the first antenna array (despite the last-assigned 5QI bearer indicating that the second antenna array is the more optimal antenna array for the UE). Similarly, if the last-assigned 5QI bearer of the UE is not equal to one, the instructions could automatically assign the UE to the first antenna array. However, if the number of UEs assigned to the first antenna array at that moment (or when last checked) exceeds a threshold of allowed UEs thereon, then the UE is assigned or reassigned to the second antenna array (despite the last-assigned 5QI bearer indicating that the first antenna array is the more optimal antenna array for the UE). This and other load-balancing techniques can be used in cooperation with the other instruction steps described herein without departing from the scope of the technology presented herein.

Figure 2:
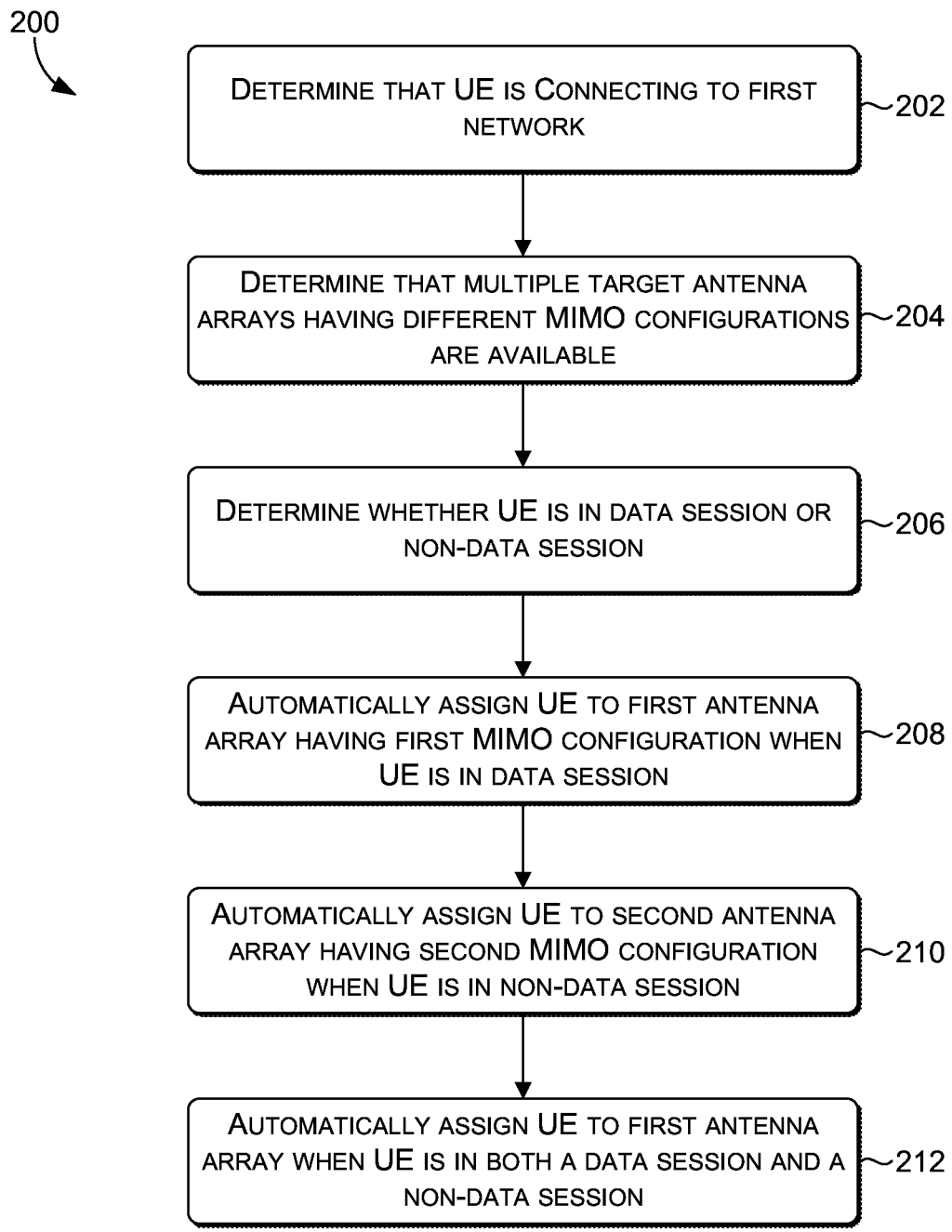
FIG. 2 depicts a flow diagrams of exemplary methods for directing a UE to optimal antenna arrays of particular MIMO configurations during fallback or handover in accordance with aspects herein.

As depicted in FIG. 2, a method 200 for directing a UE to optimal antenna arrays during fallback procedures or handover procedures can include a number of steps, which can occur in the order depicted herein or in any other order without departing from the scope of the technology herein. Furthermore, one or more steps can be added, omitted, or duplicated without departing from the scope of the technology described herein. As depicted in block 202, the method 200 can include determining that the UE is connecting to a first network such as an LTE network. In some embodiments, this step can include determining that the UE is attaching to the first network as a result of a handover or fallback procedure from a second network such as a 5G standalone (SA) network. In some embodiments, the UE is connecting to the first network due to evolved packet system fallback (ESPFB) procedures and/or inter radio access technology handover (IRATHO) procedures. Thus, this step can require overlapping SA and LTE coverage in some embodiments, or overlapping of other various network types.

As depicted in block 204, some embodiments of method 200 include a step of determining that multiple target antenna arrays having different MIMO configurations are presently available to the UE on the first network. For example, the first antenna array and the second antenna array can each be considered target antenna arrays to which the UE can communicate. Likewise, as described herein, the first antenna array and the second antenna array can have different MIMO configurations.

As depicted in block 206, the method 200 can further include a step of determining whether the UE is in the data session or a non-data session such as a voice session. This can be determined, for example, based on a last-assigned 5QI bearer of the UE or other quality of service data received from the UE. Additionally, as depicted in block 208, the method 200 can include a step of automatically assigning the UE to the first antenna array having a first MIMO configuration when the UE is in a data session. The first antenna array having the first MIMO configuration can have, for example, a 4×4 MIMO configuration as described above. In some embodiments, it can be determined that the UE is currently in the data session or some session other than a voice session based on the last-assigned 5QI bearer of the UE. For example, if the last-assigned 5QI bearer of the UE does not equal one, then the UE, for purposes of this method step, can be treated as being in the data session. Specifically, the UE can be determined to be currently in the data session when the last-assigned 5QI bearer does not equal one. As depicted in the table above, for example, a 5QI value of two could indicate a conversational video (Live Streaming) or a 5QI value of three could indicate real-time gaming, each of which is not a voice-only session and can be considered a data session for purposes of this method step. However, other ways of evaluating the 5QI bearer or other quality of service-related data to determine that the UE is in the data session can be used without departing from the scope of the technology described herein.

As depicted in block 210, the method 200 can also include a step of automatically assigning the UE to the second antenna array having a second MIMO configuration when the UE is currently in a non-data session (e.g., a voice session). The second LTE layer having the second MIMO configuration can have, for example, a 2×2 MIMO configuration as described above. However, other MIMO configurations can be assigned to the first antenna array and/or the second antenna array without departing from the scope of the technology described herein. In some embodiments, the first antenna array can have a MIMO configuration with a higher number of channels or antennas than the second antenna array, even if other N and M values of the N×M MIMO configuration are used than those described herein.

In some embodiments, it can be determined that the UE is currently in a voice session based on a last-assigned 5QI bearer of the UE. For example, if the last-assigned 5QI bearer of the UE equals one, then the UE, for purposes of this method step, can be determined to be or can be treated as being in a voice session. Specifically, in some embodiments, the UE is determined to be currently only in the voice session when the last-assigned 5QI bearer equals one. However, other ways of evaluating the 5QI bearer or other quality of service-related data to determine that the UE is in a data session can be used without departing from the scope of the technology described herein.

As depicted in block 212, in some embodiments, the method can include a step of automatically assigning the UE to the first antenna array having the first MIMO configuration when the UE is currently in both a data session and a non-data session (e.g., a voice session). For example, if there are simultaneously more than one 5QI bearers, and at least one of those 5QI bearers is not equal to one, then the UE, for purposes of this method step, is still treated as being in a data session and is rather assigned to the first antenna array instead of the second antenna array as in block 210.

Figure 3:
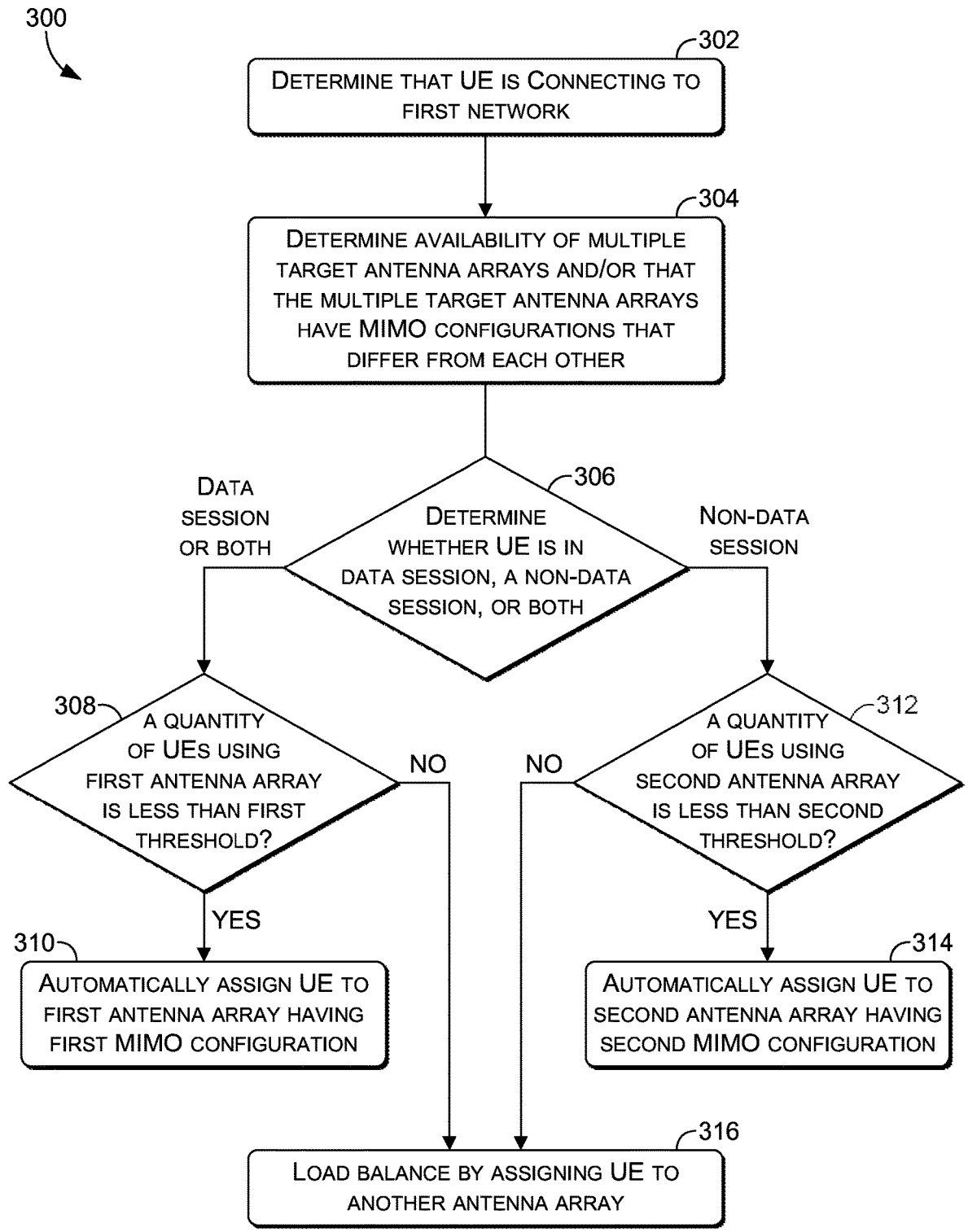
FIG. 3 depicts a flow diagrams of another exemplary method for directing a UE to optimal antenna arrays of particular MIMO configurations during fallback or handover and further includes load balancing in accordance with aspects herein.

As depicted in FIG. 3, a method 300 for directing a UE to optimal antenna arrays, such as during fallback procedures or handover procedures, can include a number of steps, which can occur in the order depicted herein or in any other order without departing from the scope of the technology herein. Furthermore, one or more steps can be added, omitted, or duplicated without departing from the scope of the technology described herein. The embodiment in FIG. 3 includes steps to address load-balancing concerns, such as when a threshold number of UEs are attached to the first network via the first antenna array or the second antenna array. As depicted in block 302, the method 300 can include a step of determining that a UE is connecting to the first network (e.g., an LTE network or an LTE node), similar to the step in block 202 above. In some embodiments, the UE is connecting to the first network due to fallback or handover procedures, such as ESPFB procedures and/or IRATHO procedures.

As depicted in block 304, some embodiments of method 300 include a step of determining that multiple target antenna arrays having different MIMO configurations are available on the first network and/or that those multiple target antenna arrays have different MIMO configurations as described above. For example, the first antenna array and the second antenna array can each be considered target antenna arrays of the first network. Likewise, as described herein, the first antenna array and the second antenna array can have different MIMO configurations.

Furthermore, as depicted in block 306, the method 300 can include a step of determining whether the UE is currently in a non-data session (e.g., a voice session), a data session, or both. As in other embodiments, this can be determined based on one or more last-assigned 5QI bearers of the UE. However, other quality of service-related data can be used without departing from the scope of the technology described herein. In some embodiments, the UE is determined to be in a non-data session or a voice session when the last-assigned 5QI bearer is equal to one. Conversely, the UE can be determined to be in a data session when the last-assigned 5QI bearer is not equal to one. Additionally, the UE can be determined to be in both the voice session and the data session when the UE is simultaneously associated with a plurality of 5QI bearers and at least one of the plurality of 5QI bearers is not equal to one. However, other quality of service-related data can indicate that both data and non-data or data and voice are in use by the UE at the time of the fallback or handover without departing from the scope of the technology described herein.

If the UE is currently in a data session, or both the voice session and the data session, the method 300 can include the following steps resulting from this trigger. Specifically, the method 300 can include the steps of determining that a quantity of UEs using the first antenna array is less than a first threshold, as depicted in block 308, and assigning the UE to the first antenna array, as depicted in block 310.

If the UE is currently in a non-data session (e.g., a voice session or a voice-only session), the method 300 can include the following steps resulting from this trigger. Specifically, the method 300 can include the steps of determining that a quantity of UEs using the second antenna array is above a second threshold, as depicted in block 312, and assigning the UE to the second antenna array, as depicted in block 314.

As in other embodiments, the first antenna array can have a first MIMO configuration, the second antenna array can have a second MIMO configuration, and the second MIMO configuration can have a lower number of channels than the first MIMO configuration. Specifically, in some embodiments, the first antenna array can have a 4×4 MIMO configuration and the second antenna array can have a 2×2 MIMO configuration. However, other MIMO configurations can be used without departing from the scope of the technology herein.

In some embodiments, the method 300 can include a step of load balancing by assigning the UE to another antenna configuration, as depicted in block 316. This step can include automatically assigning or reassigning the UE to either the first antenna array or the second antenna array based on reaching or exceeding a threshold of allowed UEs on another of the first antenna array and the second antenna array, regardless of the last-assigned 5QI bearer of the UE and/or regardless of whether the UE is in a data session or a non-data session. For example, in a situation where the quantity of UEs using the first antenna array is not less than the first threshold (i.e., is equal to and/or exceeds the first threshold), the load balancing can involve assigning the UE to the second antenna array, even though a data session would typically be assigned to the first antenna array in method 300. Likewise, in a situation where the quantity of UEs using the second antenna array is not less than the second threshold (i.e., is equal to and/or exceeds the second threshold), the load balancing can involve assigning the UE to the first antenna array, even though a non-data session would typically be assigned to the second antenna array in method 300.

These and other load-balancing techniques can be used in cooperation with the other method steps described herein without departing from the scope of the technology presented herein. Furthermore, in some embodiments, the first threshold and/or the second threshold can be automatically adjusted or otherwise set based on capacity or load balance requirements of the first network, the LTE network, the 5G NSA network, or a current node thereof. For example, a network operator can look at key performance indicators (KPIs) on UEs on the first antenna array versus the second antenna array and can automatically adjust the first threshold and/or the second threshold accordingly. Likewise, for high capacity cells or nodes, higher thresholds could be used than for non-high capacity cells.

Referring to FIG. 4, a diagram is depicted of an exemplary computing environment suitable for use in implementations of the present disclosure. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 4, computing device 400 includes bus 402 that directly or indirectly couples the following devices: memory 404, one or more processors 406, one or more presentation components 408, input/output (I/O) ports 410, I/O components 412, and power supply 414. Bus 402 represents what may be one or more busses (such as an address bus, data bus, or combination thereof). Although the devices of FIG. 4 are shown with lines for the sake of clarity, in reality, delineating various components is not so clear, and metaphorically, the lines would more accurately be grey and fuzzy. For example, one may consider a presentation component such as a display device to be one of I/O components 412. Also, processors, such as one or more processors 406, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 4 and refer to "computer" or "computing device."

Computing device 400 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD- ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. Memory 404 may be removable, nonremovable, or a combination thereof. Exemplary memory includes solid-state memory, hard drives, optical-disc drives, etc. Computing device 400 includes one or more processors 406 that read data from various entities such as bus 402, memory 404 or I/O components 412. One or more presentation components 408 presents data indications to a person or other device. Exemplary one or more presentation components 408 include a display device, speaker, printing component, vibrating component, etc. I/O ports 410 allow computing device 400 to be logically coupled to other devices including I/O components 412, some of which may be built in computing device 400. Illustrative I/O components 412 include a microphone, joystick, game pad, satellite dish, scanner, printer, wireless device, etc.

Radio 416 represents a radio that facilitates communication with a wireless telecommunications network. Illustrative wireless telecommunications technologies include CDMA, GPRS, TDMA, GSM, and the like. Radio 416 might additionally or alternatively facilitate other types of wireless communications including Wi-Fi, WiMAX, LTE, or other VoIP communications. As can be appreciated, in various embodiments, radio 416 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for directing a user equipment (UE) connecting to a first network based on evolved packet system fallback (ESPFB) procedures or inter radio access technology handover (IRATHO) procedures from a second network to an optimal antenna array, the method comprising:
   determining that the UE is connecting to the first network from the second network, wherein the first network is a long term evolution (LTE) network or a 5G non-standalone (NSA) network and the second network is a 5G standalone (SA) network;
   determining, at the second network, whether the UE is in a data session or in a non-data session based on a last-assigned 5G quality of service indicator (5QI) bearer of the UE;
   automatically assigning the UE to a first antenna array on the first network having a first multiple input multiple output (MIMO) configuration when the UE is determined to be in the data session; and
   automatically assigning the UE to a second antenna array on the first network that is associated with different LTE layers than the first antenna array and that has a second MIMO configuration with fewer layers than the first MIMO configuration when the UE is determined to be in the non-data session.

2. The method of claim 1, further comprising determining that at least two antenna arrays having different MIMO configurations are available to the UE on the first network.

3. The method of claim 2, wherein the UE is determined to be in the non-data session when the last-assigned 5QI bearer equals one, wherein the UE is determined to be in the data session when the last-assigned 5QI bearer does not equal one.

4. The method of claim 1, wherein the first antenna array has a MIMO configuration with a higher number of channels than the second antenna array.

5. The method of claim 1, wherein the first antenna array has a four by four MIMO configuration.

6. The method of claim 1, wherein the second antenna array has a two by two MIMO configuration.

7. The method of claim 1, wherein the non-data session is a voice session.

8. The method of claim 1, wherein the first antenna array corresponds to a first node and the second antenna array corresponds to the first node or to a second node.

9. A non-transitory computer-readable media comprising executable instructions that, in response to execution, cause a network device comprising one or more processors to perform operations in a radio access network (RAN) for directing a user equipment (UE) connecting to a first network based on evolved packet system fallback (ESPFB) procedures or inter radio access technology handover (IRATHO) procedures from a second network to an optimal antenna array, the executable instructions comprising the steps of:
   determining that the UE is connecting to the first network from the second network, wherein the first network is a long term evolution (LTE) network or a 5G non-standalone (NSA) network and the second network is a 5G standalone (SA) network;

determining, at the second network, whether the UE is in a data session or in a non-data session based on a last-assigned 5G quality of service indicator (5QI) bearer of the UE;

automatically assigning the UE to a first antenna array on the first network having a first multiple input multiple output (MIMO) configuration when the UE is determined to be in the data session; and automatically assigning the UE to a second antenna array on the first network that is associated with different LTE layers than the first antenna array and that has a second MIMO configuration with fewer layers than the first MIMO configuration when the UE is determined to be in the non-data session.

10. The computer-readable media of claim 9, the executable instructions further comprising a step of determining determining that at least two antenna arrays having different MIMO configurations are available to the UE on the first network.

11. The computer-readable media of claim 10, wherein the UE is determined to be in the non-data session when the last-assigned 5QI bearer equals one, wherein the UE is determined to be in the data session when the last-assigned 5QI bearer does not equal one.

12. The computer-readable media of claim 9, wherein the first antenna array has a four by four MIMO configuration and the second antenna array has a two by two MIMO configuration.

13. The computer-readable media of claim 9, wherein the non-data session is a voice session.

14. A system for directing a user equipment (UE) connecting to a first network based on evolved packet system fallback (ESPFB) procedures or inter radio access technology handover (IRATHO) procedures from a second network to an optimal antenna array, the system comprising:

a network device comprising one or more processors; and a non-transitory computer-readable media comprising executable instructions that, in response to execution, cause the network device to perform operations in a radio access network (RAN), the executable instructions comprising the steps of:

determining that the UE is connecting to the first network from the second network, wherein the first network is a long term evolution (LTE) network or a 5G non-standalone (NSA) network and the second network is a 5G standalone (SA) network;

determining, at the second network, whether the UE is in a data session or in a non-data session based on a last-assigned 5G quality of service indicator (5QI) bearer of the UE;

automatically assigning the UE to a first antenna array on the first network having a first multiple input multiple output (MIMO) configuration when the UE is determined to be in the data session; and automatically assigning the UE to a second antenna array on the first network that is associated with different LTE layers than the first antenna array and that has a second MIMO configuration with fewer layers than the first MIMO configuration when the UE is determined to be in the non-data session.

15. The system of claim 14, wherein the first antenna array has a MIMO configuration with a higher number of channels than the second antenna array.

16. The system of claim 14, the executable instructions further comprising a step of determining that at least two antenna arrays having different MIMO configurations are available to the UE on the first network.

\* \* \* \* \*